United States Patent [19]
Focke

[11] Patent Number: 5,507,177
[45] Date of Patent: Apr. 16, 1996

[54] METHOD AND APPARATUS FOR TESTING THE TIGHTNESS OF FOIL BAGS

[75] Inventor: Heinz Focke, Verden, Germany

[73] Assignee: Focke & Co. (GmbH & Co.), Verden, Germany

[21] Appl. No.: 361,711

[22] Filed: Dec. 22, 1994

Related U.S. Application Data

[63] Continuation of Ser. No. 93,149, Jul. 19, 1993, abandoned.

[30] Foreign Application Priority Data

Jul. 20, 1992 [DE] Germany ............... 42 23 793.9

[51] Int. Cl.⁶ ......................................... G01M 3/36
[52] U.S. Cl. ........................... 73/49.3; 73/52; 73/41
[58] Field of Search ................. 73/41, 45.4, 49.3, 73/52, 49.2

[56] References Cited

U.S. PATENT DOCUMENTS

| | | | |
|---|---|---|---|
| 3,918,293 | 11/1975 | Feigel | 73/49.3 |
| 4,024,956 | 5/1977 | Cassidy | 73/49.3 |
| 4,510,730 | 4/1985 | Edmondson | 73/49.3 |
| 4,517,827 | 5/1985 | Tapscott | 73/49.3 |
| 4,955,226 | 9/1990 | Beaty et al. | 73/52 |

FOREIGN PATENT DOCUMENTS

| | | | |
|---|---|---|---|
| 2939882 | 4/1980 | Germany. | |
| 3716095 | 9/1988 | Germany. | |
| 273409 | 11/1989 | Germany. | |
| 38835 | 2/1990 | Japan | 73/52 |
| 2113406 | 8/1983 | United Kingdom. | |
| 2162648 | 2/1986 | United Kingdom. | |
| 2196130 | 4/1988 | United Kingdom | 73/52 |
| WO17317 | 9/1993 | WIPO | 73/52 |

OTHER PUBLICATIONS

JP 3–14435 A. Patents Abstracts of Japan, M–1098, Mar. 28, 1991, vol. 15, No. 129.

*Primary Examiner*—Hezron E. Williams
*Assistant Examiner*—Daniel S. Larkin
*Attorney, Agent, or Firm*—Sughrue, Mion, Zinn, Macpeak & Seas

[57] ABSTRACT

Disclosed are a method and apparatus for testing the tightness of foil bags (10). In order to test the tightness of foil bags (10), mechanical testing members are used which act upon the foil bag (10) in the region of a cavity (15) formed above the packaged goods. Testing rams (18) are pushed against a bag wall (16, 17) with a given testing pressure. The depth of impression is indicative of the airtightness of the foil bag (10). The size of the cavity (15) which can be used for testing is reduced by clamping members (26) and, as a result, a residual cavity (25) is formed next to the clamping members (26). Consequently, an increased pressure is present within the residiual cavity, that is to say within the foil bag (10), which facilitates testing.

17 Claims, 4 Drawing Sheets

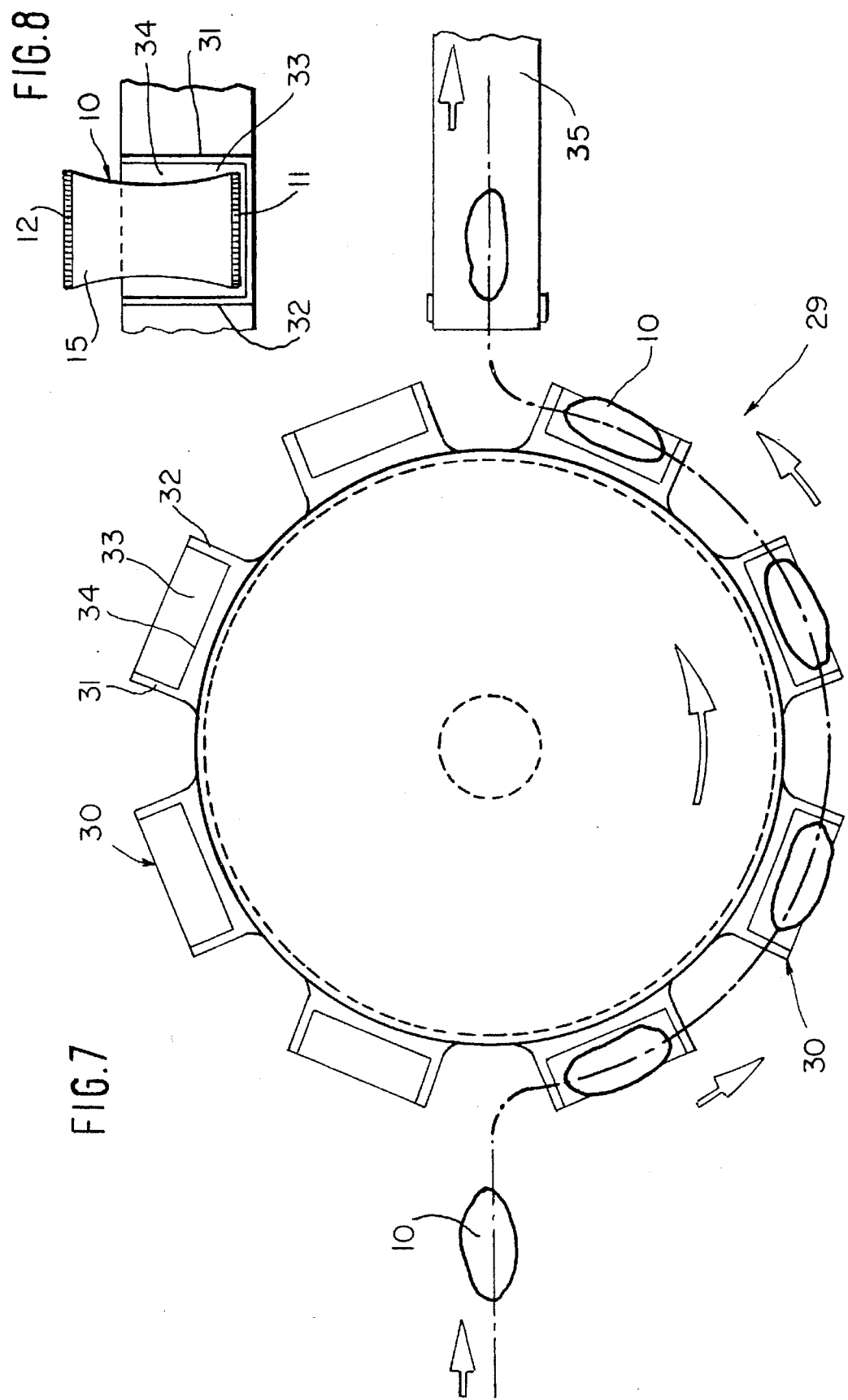

METHOD AND APPARATUS FOR TESTING THE TIGHTNESS OF FOIL BAGS

This is a Continuation of application Ser. No. 08/093,149 filed Jul. 19, 1993 now abandoned.

BACKGROUND OF THE INVENTION

The invention relates to a method of testing the tightness of foil bags, especially of tube bags filled with bulk goods, in which the packaged goods only partially fill the interior space of the bag. Additionally, the invention relates to an apparatus for carrying out the method, in which testing means act upon the outer side of foil walls.

The foil bags serve for accommodating bulk goods of different kinds, including especially so-called crisp savoury food products such as potato crisps, peanuts, etc. Leaky foil bags have to be identified and excluded from the following packaging process.

SUMMARY OF THE INVENTION

It is the object of the invention to propose a testing method and testing apparatus which, on the one hand, permit reliable testing of the airtightness of foil bags at short cycle times and, on the other hand, ensure that fragile bulk goods such as potato crisps are not impaired by the airtightness test.

To attain this object, the method according to the invention is characterized in that the testing means act upon the foil bag in a region beyond the packaged goods.

The invention takes advantage of the fact that the foil bags to be tested are filled only partially. The volume of the packaged goods is smaller than the interior space of the foil bags. The foil bags are located in an upright position during testing and the packaged goods collect in the lower region, whereas a cavity is formed in the upper region, i.e. above the goods. This cavity is utilized according to the invention for testing the tightness of the bags.

According to the invention, mechanical testing means serve for testing the airtightness of the bag and act upon oppositely situated sides of the foil bag under a given testing pressure in the region of the cavity and exert a testing pressure on the foil bag. The depth of impression of the testing means and/or the measured compressive strength of the foil bag is indicative of the airtightness of the foil bag. If the bag is leaky, air escapes as a result of the pressure exerted by the testing means.

Another important feature of the invention is that the cavity of the foil bag which is used for the airtightness test is reduced in size, such that the pressure inside the residual cavity which is formed in this manner is increased. To reduce the size of the cavity, a portion thereof is compressed by clamping means. These clamping means preferably act upon the bag laterally, so that the residual cavity used for testing also forms in a lateral region of the foil bag.

Expediently, the testing of the foil bags described above is conducted over a relatively long period, especially while the bags are moved along a relatively long conveying path. As a result, even small leaks with a correspondingly small leakage of air can be detected.

According to the invention, the test is conducted while the foil bags are transported, preferably continuously transported, in an upright position. Particularly advantageous is a testing turret comprising pockets or other receptacles for the foil bags which are disposed on the outer periphery of the turret. Each pocket is provided with testing means and, if appropriate, clamping means, so that the test can be conducted during the rotation of the testing turret.

Further details of the invention will be described hereinafter with reference to exemplary embodiments and the accompanying drawings, in which:

BRIEF DESCRIPTION OF THE DRAWING

FIG. 7 shows a schematic plan view of a further embodiment of the apparatus, and FIG. 8 is a front view of an individual turret pocket containing a foil bag.

DESCRIPTION OF PREFERRED EMBODIMENTS

Figure 1:
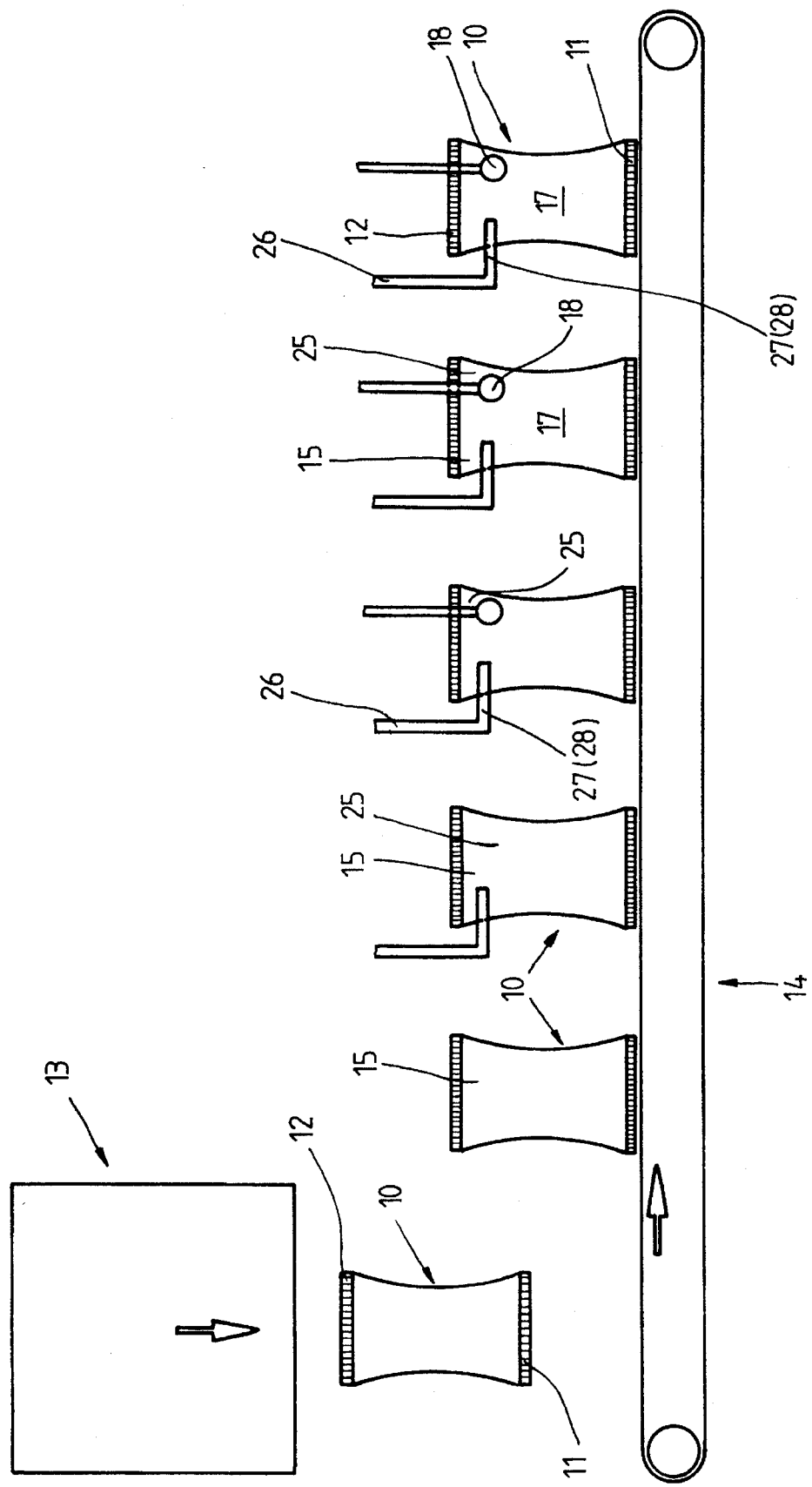
FIG. 1 shows a sketchily illustrated side view of a testing apparatus, and a plurality of foil bags in a vertically upright position (taken at the level of the testing means 18 and clamping means 26, FIG. 2 shows a horizontal section of a foil bag, FIG. 3 shows a horizontal section of the foil bag while it is being prepared for the tightness test, FIG. 4 shows the foil bag during the tightness test, FIG. 5 show successive stages during the testing of a and (leaky) foil bag.
Figure 2:
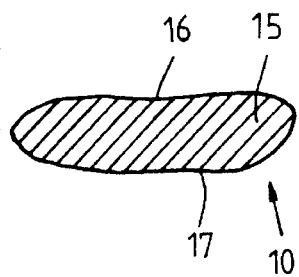
Figure 3:
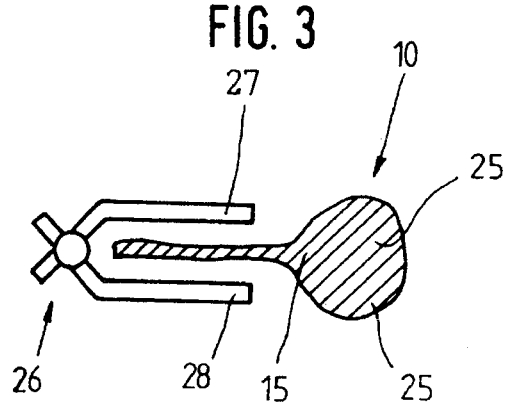

The illustrated exemplary embodiment is directed to testing the airtightness of foil bags 10 taking the form of tube bags. This type of foil bag 10 is comprised of a section of a foil formed in a tubular manner and having a longitudinal seam (not shown). A tube section forms the foil bag 10. This foil bag is closed at the top and bottom by transversely directed sealing or bonding seams, in particular by a bottom seam 11 and an upper closure seam 12.

A foil bag 10 which is formed in this manner is produced and filled in the region of a known bag forming and filling machine 13. For this purpose, a foil web is usually placed around a filler pipe and is formed into a tube by way of applying a continuous longitudinal seam. The goods are filled into the tube which is provided with the bottom seam 11 through the filler pipe. Subsequently, the foil bag 10 is severed from the tube and, at the same time, the upper closure seam 12 is applied.

The bags can be filled with different kinds of bulk goods, especially with so-called crisp savoury food products such as (potato) crisps, peanuts, etc.

Before the foil bags 10 are packed into cartons they must be checked for leakages. In the illustrated exemplary embodiment, testing is conducted immediately after the bags have been produced in the bag forming and filling machine 13. The foil bags 10 exit this bag forming and filling machine 13 from underneath and reach an endless conveyor by means of a downward movement. In the exemplary embodiment of FIG. 1 this endless conveyor takes the form of a conveyor belt 14. Expediently, the foil bags 10 freely fall at least through a portion of the downwardly directed conveying path. The impact resulting from the bags falling onto a base, in this case on the conveyor belt 14, ensures that the bag contents collect in the lower region of the foil bag 10. Because in this type of pack the volume of the packaged goods is always smaller than the overall interior volume of the foil bag 10, a cavity 15 is formed in the upper region of the bag, in particular above the packaged goods which rest on the bottom seam 11.

The foil bags 10 are tested in an upright position. This airtightness test is conducted by (mechanical) testing means which act upon the outer side of the foil bag 10 only in the upper region which does not contain any goods, i.e. only in the region of the cavity 15. The test is conducted such that testing means exert pressure on oppositely situated bag walls 16, 17. The testing method is based on a certain quantity of air or gas in a closed airtight foil bag 10. A testing means is moved against the bag walls 16, 17 with a specific given testing pressure. The depth of impression is a measurable quantity indicative of the airtightness of the foil bag. The testing means acts only in the region of the cavity 15 of each bag, so that the packaged goods are not affected by the testing process.

Figure 4:
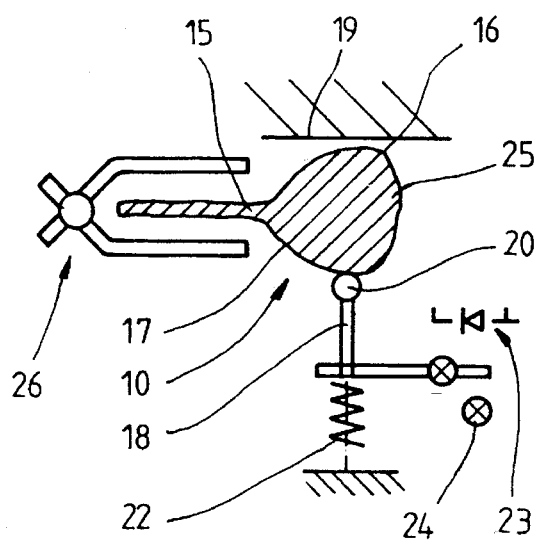
Figure 5:
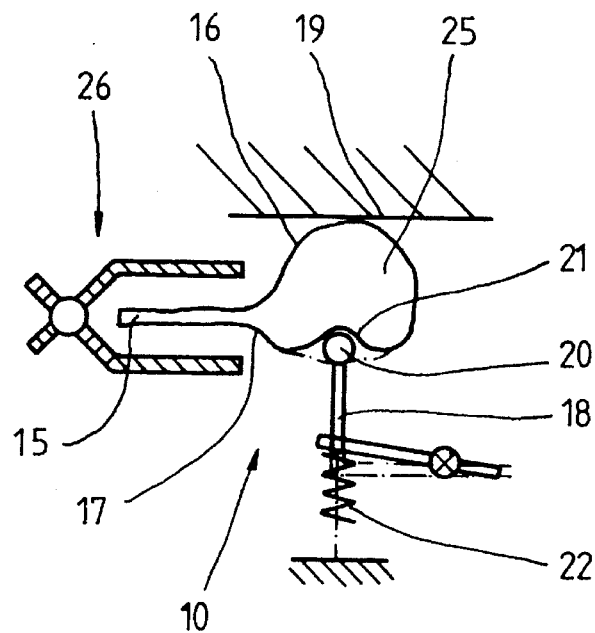
Figure 6:
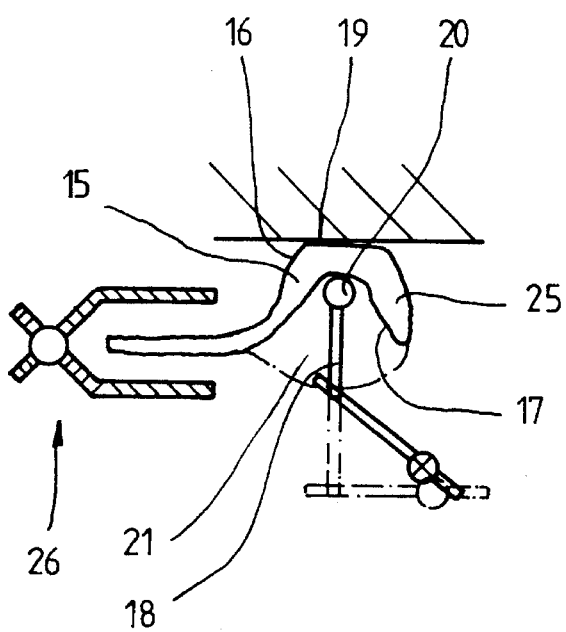
FIG. 6

The present exemplary embodiment comprises a testing ram 18 (FIGS. 4 to 6). This testing ram is moved against one side of the foil bag 10 i.e., against the bag wall 17. The foil bag 10 bears with the opposite side, i.e. with the bag wall, against a supporting member, for example, against stationary guide wall 19 shown in FIGS. 4–6. The testing ram 18 is provided with a rounded testing head 20. This testing head compresses the foil bag 10 in the region of the cavity 15. As a result, an impression 21 or dent is formed in the foil bag 10. If the bag is leaky, the air or gas inside the foil bag 10 which is subjected to an increased pressure by the testing means escapes through the leak. The testing ram 18 is moved further in the testing direction, so that the foil bag 10 is finally substantially compressed (FIG. 6) because the air escapes from the foil bag 10. This position of the testing means triggers a signal which effects a removal of the defective foil bag 10.

The testing means, i.e. the testing ram 18 is subjected to a specific testing pressure which is defined by a spring 22 in the present case. This constant preselected testing pressure is adjusted to the internal pressure in the foil bag 10 in such a way that, the foil bag 10 is intact, the testing head 20 does not effect any impression or only a small depth of impression. In FIG. 5 and FIG. 6 the position of the testing ram 18 in the case of correct airtight foil bags 10 is indicated by broken lines. The position of the testing ram or testing head 20 can be determined by a light barrier with appropriate optoelectrical sensors 23, 24.

Another outstanding feature is that the cavity 15 formed above the packaged goods is reduced in size in order to test the bags in the manner described above. The total volume of the air within the foil bag 10 is thus compressed to a smaller space. A residual cavity 25 formed in the region of the cavity 15 is filled in a balloon-like, i.e. taut manner. The testing means (testing ram 18) act upon this region, i.e. upon the bag walls 16, 17 of the balloon-like residual cavity 25.

In the present exemplary embodiment, a clamping means 26 is placed against the bag walls 16, 17 of the foil bag 10 and is located at the same level as the testing ram 18 as shown in FIG. 1. The clamping means 26 acts in the region of the cavity 15. Two clamping jaws 27, 28 engage the bag walls 16, 17 on opposite sides and flatly compress a portion of the cavity 15. As a result, the bloated residual cavity 25 is formed in a lateral upper region of the foil bag 10, and in this region the testing means takes effect.

Alternatively, the testing means can be designed such that airtightness is tested only by pressure means which act in the region of the cavity 15, i.e. above the packaged goods. Such pressure means must have large surfaces, so that the foil bag 10 is (almost) entirely subjected to pressure in the region of the cavity 15. In this embodiment, airtightness can also be tested in response to the depth of impression, that is to say the relative position of the pressure means.

Expediently, the present testing method is conducted during the continuous transport of the foil bags 10. In the exemplary embodiment of FIG. 1, the foil bags 10 are continuously transported by the conveyor belt 14 during testing. The testing means travel synchronously with the foil bags 10, just like the clamping means. After testing, the intact foil bags 10 are fed to a packaging station.

FIG. 7 and FIG. 8 show an alternative solution. In this embodiment, the foil bags are fed to a testing turret 29, for example with the aid of a conveyor belt, after they have left the bag forming and filling machine 13. This testing turret is a conveyor which (continuously) rotates about a vertical axis and comprises receptacles or pockets 30 disposed on the outer periphery thereof. Each pocket receives a foil bag 10. In the testing turret 29, the foil bags 10 are disposed in the pockets 30 in an upright position. Each of pockets 30 is defined by side walls 31, 32. The foil bag 10 stand on a pocket bottom wall 33 and rest against a pocket inner wall 34. The pockets 30, i.e., the side walls 31, 32 and an inner wall 34, has less height than the foil bags 10, so that there projects from each pocket an upper bag region containing the cavity 15. Additionally, each pocket is provided with the testing means and clamping means in order to conduct testing during the transport of the foil bags 10. In the illustrated example, the foil bags 10 are conveyed by the testing turret 29 along a semi-circle and are then transferred to a discharge conveyor leading to the packaging station. The foil bags 10 are located in an upright position in the region of the testing turret 29 as well.

The test method is expediently conducted over a relatively long period. In the exemplary embodiment of FIG. 7, testing is conducted in the region of the testing turret 29. Consequently, the testing means (testing rams 18) act upon the bags for a relatively long period. As a result, it is possible to test even those bags which have only small leaks.

What is claimed is:

1. A method of testing the air-tightness of foil bags (10) containing packaged goods which only partially fill the interior space of each foil bag (10), said method comprising the following steps:

a) horizontally moving the foil bags (10) in only a vertically upright position along a conveying path so that the packaged goods collect only in a lower region of each upright foil bag (10), and so that an initial cavity (15) free of the packaged goods is formed in only an upper region of the foil bag and above the packaged goods;

b) during the movement of the foil bags, first, compressing walls (16, 17) of the bag under action of clamping means only in a laterally adjacent region of said initial cavity (15) to produce, only in said upper region of the bag, a smaller billowed residual cavity (25), as a part of said initial cavity (15), above the packaged goods, said clamping means moving along with the foil bag; and c) then, also during the compressing and movement of the upright foil bags, testing the foil bags (10) by testing means which act upon said walls (16, 17) of the foil bags and which also move along with the foil bags;

d) wherein said testing step comprises causing the testing means to act upon the foil bags (10) by exerting pressure on the bag walls (16, 17) of each foil bag only in the region of said residual cavity (25).

2. The method as claimed in claim 1, further comprising the step of causing the testing means and the clamping means continuously to act upon the foil bags (10) during movement of the foil bags (10) along a continuous semicircular conveying path of a testing turret (29), so that a loss of air can be detected even in the case of small leakages.

3. The method as claimed in claim 1, wherein said testing step comprises causing a testing ram (18) to contact an outer side of the bag walls (16, 17), and determining the airtightness in response to a depth of impression of the testing ram (18).

4. The method as claimed in claim 1, 2 or 3, further comprising the step of, before said moving step, causing the foil bags to free fall onto the conveying path so that the packaged goods settle in the lower region of each foil bag.

5. The method as claimed in claim 1, 2 or 3, further comprising the steps of causing the testing means to act in a direction transverse to the upright foil bags, and selecting the initial cavity to be smaller than said lower region.

6. The method as claimed in claim 1, wherein the foil bags (10) are moved along a horizontal conveying path.

7. The method as claimed in claim 6, wherein the foil bags (10) are moved in an upright position on a conveyor belt (14).

8. The method as claimed in claim 1, wherein the foil bags (10), for clamping and testing, are moved in pockets of a testing turret (29) rotating about a vertical axis, each pocket having said testing and clamping means.

9. The method as claimed in claim 1, wherein two clamping jaws (27, 28) of the clamping means grasp said bag walls (16, 17) on opposite sides thereof and flatly compress a region of the cavity (15) so that the residual cavity (25) is formed in a lateral upper area of the foil bag (10).

10. The method as claimed in claim 1, wherein the clamping means and the testing means are operative next to one another at approximately the same level in an upper region (15, 25) of the bags.

11. The method as claimed in claim 1, wherein testing rams (18) are provided as said testing means and press each residual cavity (25) against a rigid wall (19).

12. The method according to claim 1, wherein the compressing by the clamping means and the exertion of pressure by the testing means both occur in the horizontal direction.

13. An apparatus for testing the air-tightness of foil bags (10) containing packaged goods which only partially fill the interior space of each foil bag (10), said apparatus comprising:

a) a conveyor for horizontally moving and accommodating the foil bags (10) in only a vertically upright position of the bags along a path so that the packaged goods collect only in a lower region of each foil bag, thereby forming in each bag an upper initial cavity (15) that is free of the packaged goods;

b) a plurality of bag-clamping means which are movable synchronously along with said conveyor and which act first only in a region of said initial cavity (15) above the goods to clamp together outer walls of each foil bag to form a smaller billowed residual cavity (25) as a part of said initial cavity (15);

c) a plurality of bag-testing means which also are movable synchronously along with the conveyor, and which act to test the air-tightness of the upright bags while said outer walls are clamped; and d) wherein said testing means and said clamping means are disposed at approximately the same vertical level and at a location laterally adjacent said initial cavity (15), so that each of the foil bags (10) is first clamped and then tested only in said residual cavity (25) which is located only above the packaged goods and which is free of packaged goods.

14. The apparatus as claimed in claim 13, wherein each of said clamping means comprises clamping jaws (27, 28) which clamp together the opposite lateral side walls (16, 17) of the foil bag (10) only in the region of said initial cavity.

15. The apparatus as claimed in claim 13 or 14, wherein said conveyor comprises a testing turret (29) which continuously transports the foil bags in an upright position in a plurality of turret pockets, each turret pocket being equipped with one of said testing means and one of said clamping means.

16. The apparatus as claimed in claim 13, wherein each of said testing means comprises a testing ram (18) arranged transversely relative to the upright foil bags (10), and further comprising means for measuring a depth of impression of said testing ram, into a side wall of said residual cavity, as a measure of an amount of air in the cavity.

17. The apparatus according to claim 13, wherein both said testing means and said clamping means exert pressure, in the horizontal direction, on said outer walls of the foil bag.

* * * * *